Figure 1:
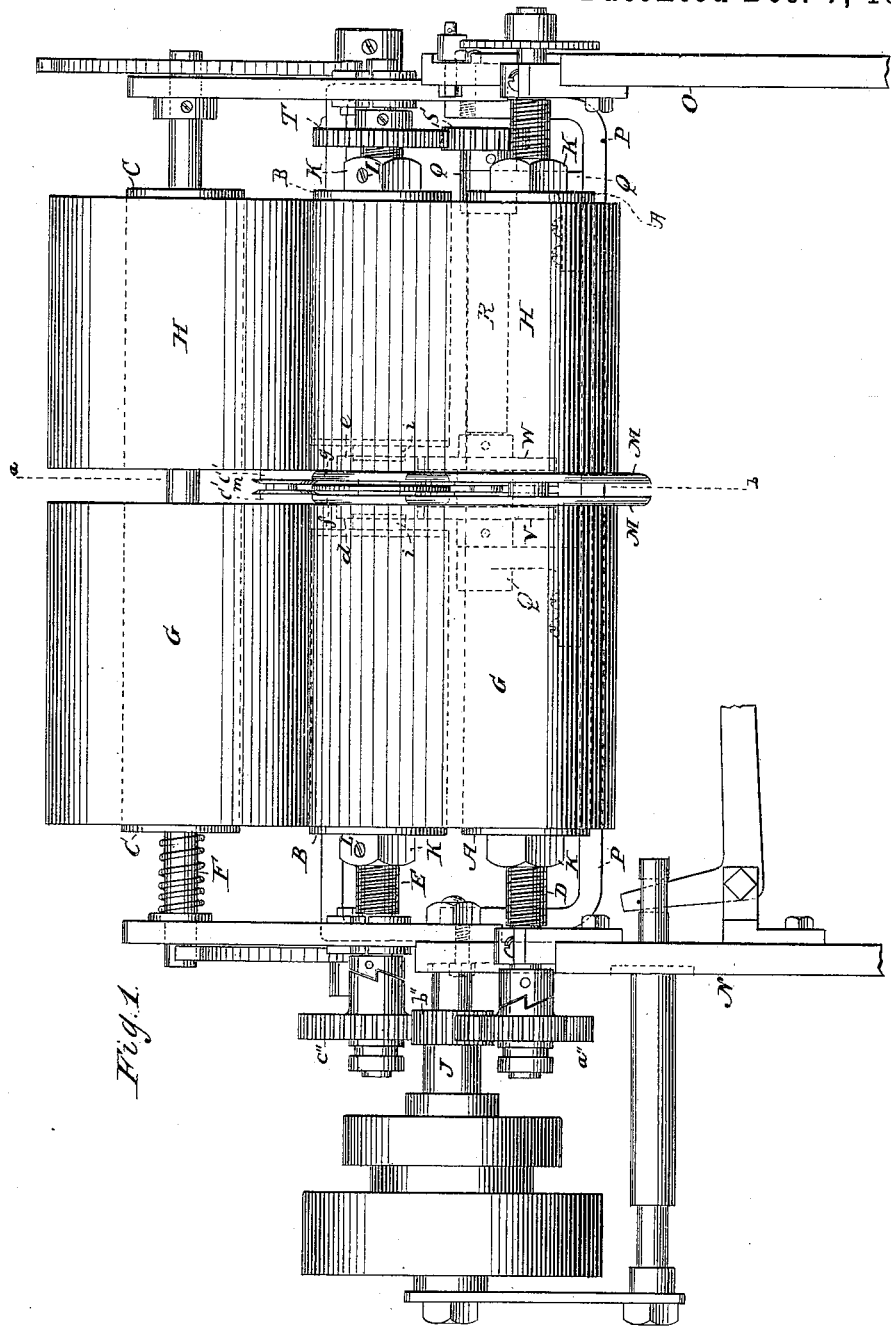

(No Model.) 4 Sheets—Sheet 1.

G. ROWDEN.
MACHINE FOR STRIPPING AND BOOKING TOBACCO.

No. 353,971. Patented Dec. 7, 1886.

WITNESSES:
Edward Wolff
William B. Alison

INVENTOR
George Rowden,
BY
Chas. C. Gill
ATTORNEY

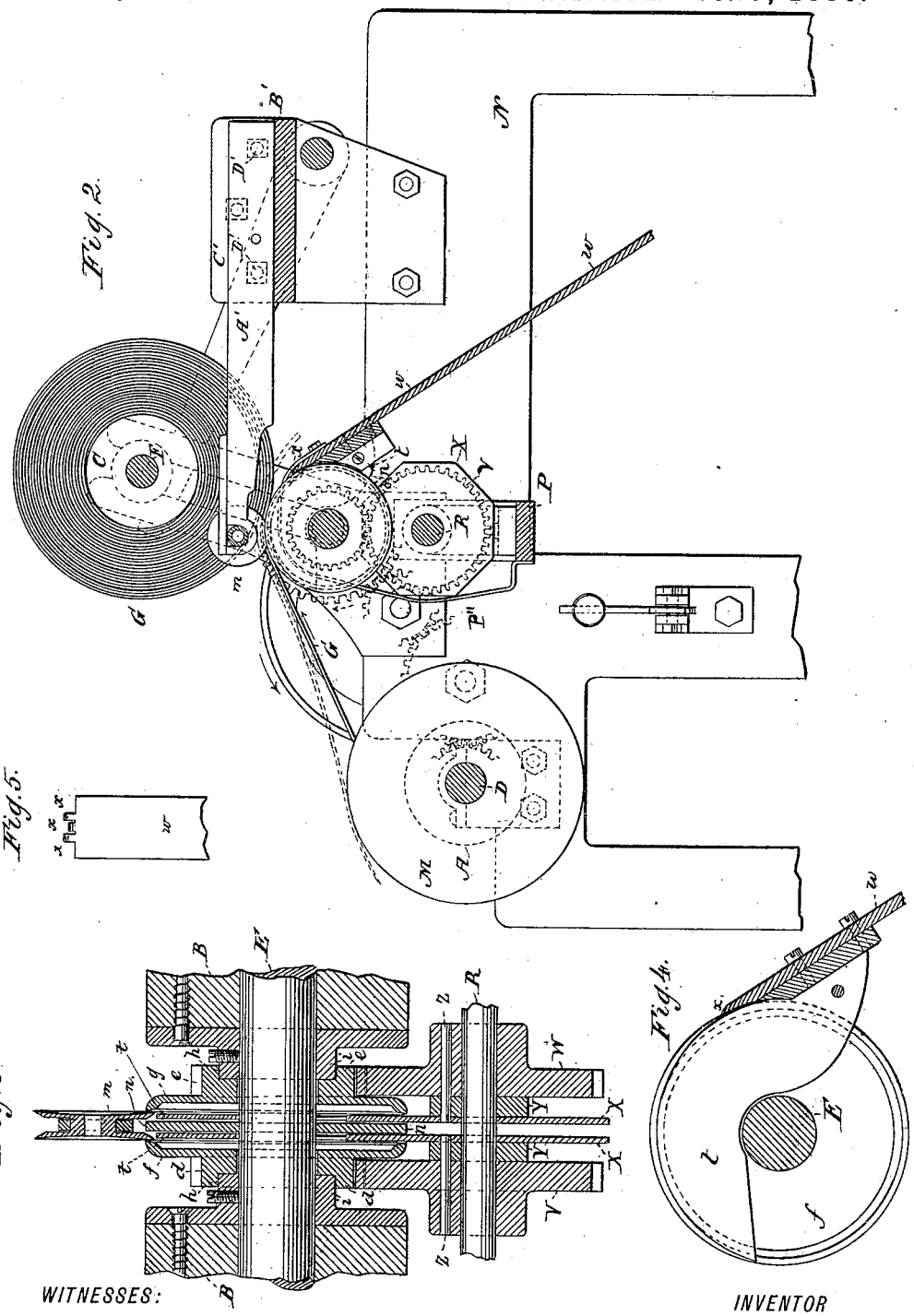

(No Model.) 4 Sheets—Sheet 3.

G. ROWDEN.
MACHINE FOR STRIPPING AND BOOKING TOBACCO.

No. 353,971. Patented Dec. 7, 1886.

WITNESSES:
Edward Wolff
A. L. Shaw

INVENTOR
George Rowden
BY Chas. E. Gill
ATTORNEY (No Model.) 4 Sheets—Sheet 4.
G. ROWDEN.
MACHINE FOR STRIPPING AND BOOKING TOBACCO.
No. 353,971. Patented Dec. 7, 1886.
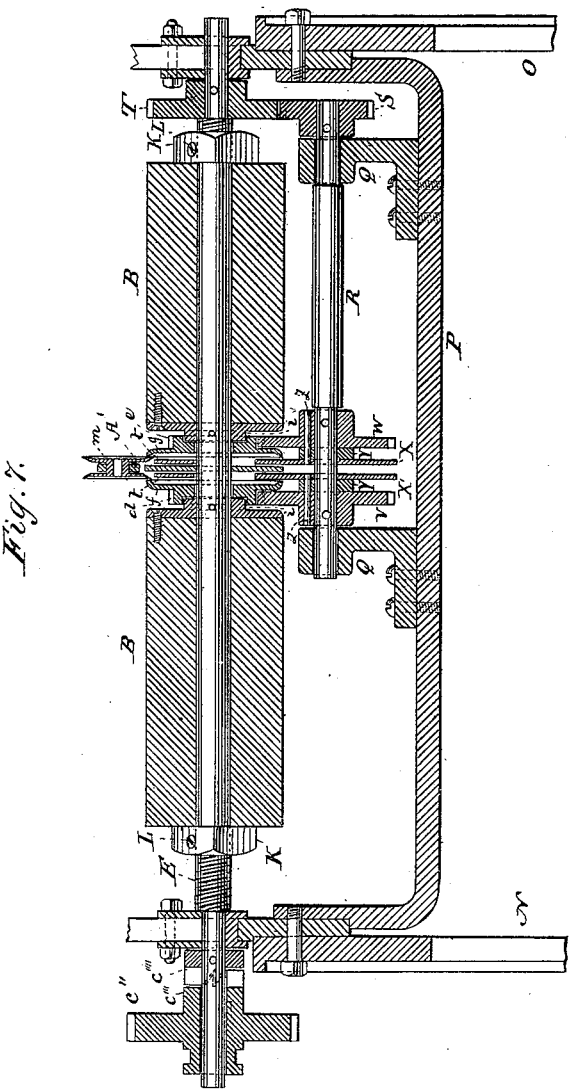
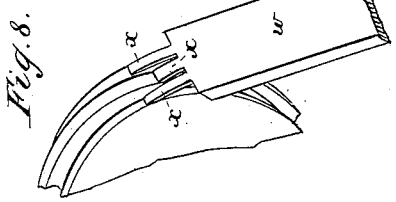
WITNESSES:
Edward Wolff.
A. L. Shaw
INVENTOR
George Rowden,
BY Chas. E. Gill
ATTORNEY
N. PETERS, Photo-Lithographer, Washington, D. C.

UNITED STATES PATENT OFFICE.

GEORGE ROWDEN, OF NEWARK, NEW JERSEY, ASSIGNOR TO JOHN R. WILLIAMS, OF SAME PLACE.

MACHINE FOR STRIPPING AND BOOKING TOBACCO.

SPECIFICATION forming part of Letters Patent No. 353,971, dated December 7, 1886.

Application filed November 12, 1885. Serial No. 182,507. (No model.)

*To all whom it may concern:*

Be it known that I, GEORGE ROWDEN, a citizen of the United States, and a resident of Newark, in the county of Essex and State of New Jersey, have invented certain new and useful Improvements in Machines for Stripping and Booking Tobacco, of which the following is a specification.

The invention relates to improvements in machines for stripping and booking tobacco, and particularly to that part of the machine by which the stem is removed from the leaf.

One of the stripping and booking machines now in use and heretofore patented consists, essentially, of a pair of knives revolving against the center of a cast-iron roller and a pair of traveling aprons one on each side of the pair of knives and arranged so as to unwind from one cylinder below and move upward against said cast-iron roller and be wound upon a cylinder located above said roller. In the operation of this machine the tobacco-leaf is laid upon the aprons, its stem being centrally between them, and as the aprons travel to the upper roller the stem is carried between the revolving knives, which remove it and permit the two halves of the leaf to be wound up between the layers of the apron on the upper cylinder. After a number of leaves have been thus treated, the apron wound upon the upper cylinder forms a book and is removed from the machine.

The object of the present invention is to remedy certain objections to and defects in the said machine heretofore patented and in use, and especially those which have applied to the means for cutting off the stem from the leaf. In the said machine, among other objections, the knives, revolving against a cast-iron roller, lose their edge after a few hours use, and hence must necessarily be frequently removed and reground, and, in addition, the knives revolve by frictional contact with the roller, and hence the rapidity of their movement is controlled wholly by the same, the result of which is that should any portion of the leaf not be fully severed by the knives passing once over it—a not infrequent occurrence—the leaf would become torn and injured by the traveling aprons.

To remedy the aforesaid objections and produce a machine in which the knives do not revolve against a cast-iron roller, and are not controlled in their movement by such roller, are the purposes of my present invention.

Figure 6:
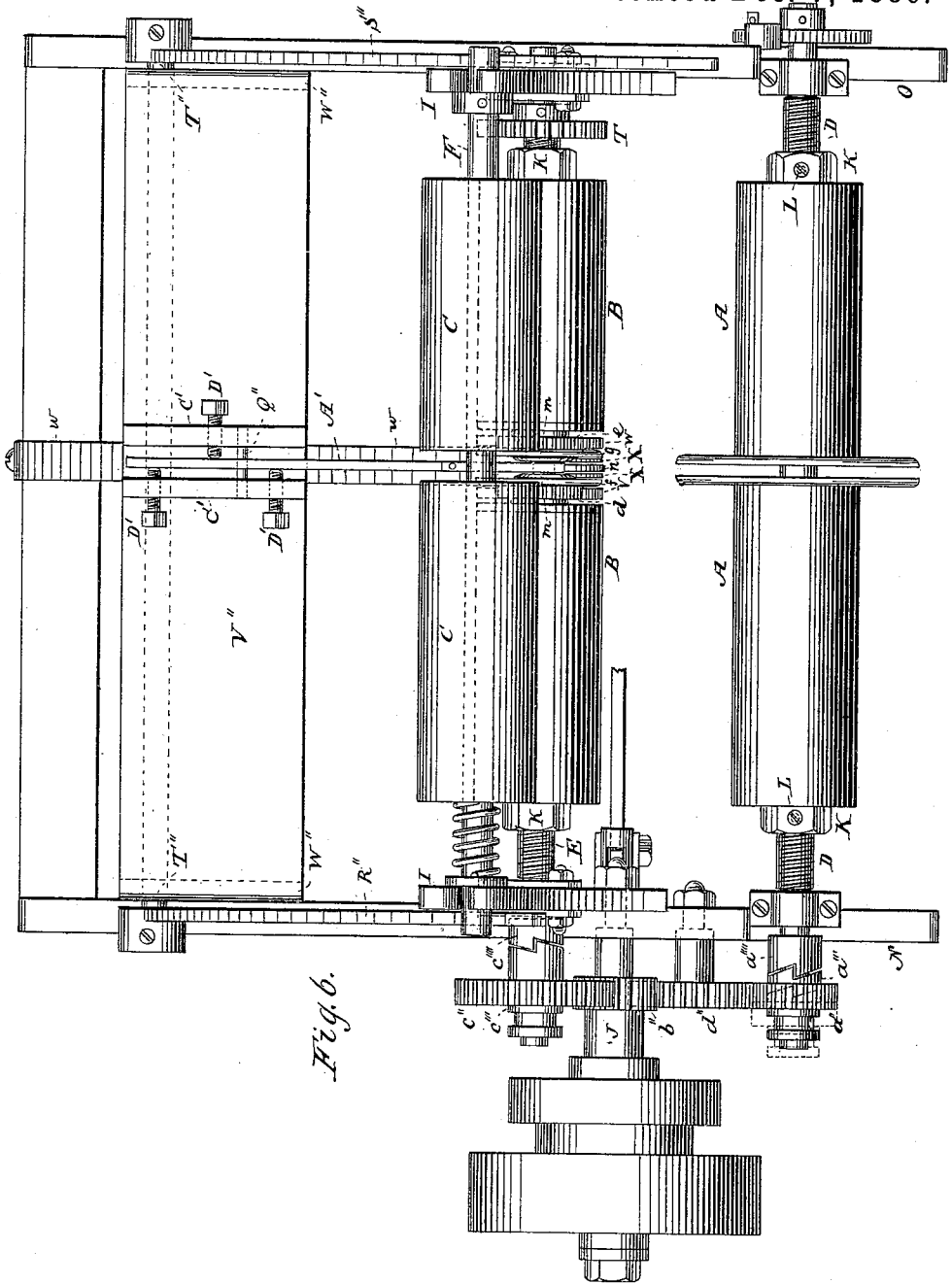

In the drawings, Figure 1 is a front elevation of a stripping and booking machine embodying the elements of my invention. Fig. 2 is a vertical transverse section of same on the dotted line *a b* of Fig. 1. Fig. 3 is a central vertical longitudinal section of the stripping mechanism detached from the machine. Fig. 4 is a detached side elevation, partly in section, of one of the disks coacting with the knives and of the cleaner for said disk, said parts being referred to by letter hereinafter. Fig. 5 is a face view of a detached feature of the machine hereinafter mentioned. Fig. 6 is a plan view of the machine, the aprons being removed. Fig. 7 is a vertical section of the machine, taken on a line through the longitudinal center of the rollers B, hereinafter referred to; and Fig. 8 is an enlarged detached perspective view, partly broken away, of the cleaner shown in Fig. 5 and connecting parts.

Referring to the drawings, A, B, and C respectively designate three pairs of rollers mounted on the axles lettered, respectively, D, E, and F, the pair of rollers A being at the front part of the machine, that lettered B being a suitable distance above and in rear of the rollers A, and the rollers C being over and in close relation to the rollers B.

Upon the rollers A C are the aprons G H of the usual kind, arranged to travel from the rollers A to and around the rollers C in the customary manner. The ends of the axle of the rollers C are retained in the slotted standards or guides I, and the said rollers receive their motion by being in frictional contact with the rollers B. Below the ends of the axle of rollers C are the front portions of the arms R″ S″, one being at each side of the machine, and the one at the right-hand side of the machine being the longer of the two, as shown in Fig. 6, for the purpose of forming an extension in front of the rollers C, that may be grasped by the hand of the operator. The arms R″ S″ are firmly secured at their rear end upon the rock-shaft T″, which is journaled in the depending ends W″ of the plate V″. The arms R'' S'' and shaft T'' constitute a frame whereby the rollers C may, from one side of the machine, be elevated above the guides I for the purpose of permitting their ready removal, with their axle and the "booked" leaf, by hand. The rollers A receive their motion from the main driving-shaft J through the gear-wheel b'' on said shaft, the intermediate wheel, d'', and the gear-wheel a'', the latter being on the axle D of said rollers A, and the rollers B receive motion from the shaft J through said gear-wheel b'' and the gear-wheel c'' on the end of the axle E, carrying the rollers B, and said rollers are locked in the position desired on said axles by the nuts K, which engage a thread on the same, and are provided with set-screws L. On the inner facing ends of the rollers A are secured the plates or heads M, which prevent the edges of the aprons G H from overlapping the edges of said rollers and obstructing the operation of the machine. The gear-wheel a'' is secured on the sleeve a''', encompassing the end of axle D and forming the movable section of a clutch, the rigid part of which is lettered a''''. When the two parts of the clutch engage each other, motion from the driving-shaft will be imparted to the axle D, and when said parts are relieved from each other the axle D will remain at rest, even though the driving-shaft be in motion. The gear-wheel c'' is secured on a sleeve, c''', which encircles the end of axle E, and constitutes the movable section of a clutch, the rigid section of which is designated by the letter c''''. By means of this clutch the motion of the main shaft may be communicated to the axle E or cut off therefrom at will. If it should be desired to rewind the traveling aprons G H upon the rollers A A from the rollers C C, the two parts of the clutch on the axle D will engage each other, and the parts of the clutch on the axle E will be separated from each other. During the operation of stripping the leaf the aprons are wound upon the rollers C C, and at this time the parts of the clutch on the axle E will engage each other, and the parts of the clutch on the axle D will be relieved from each other. When one clutch is in operation, the other clutch is idle.

Between the sides N O of the machine is secured the cross-bar P, located in rear of the rollers A, and sustaining bearings Q Q, in which are journaled the shaft R, having upon its right-hand end the gear-wheel S, which meshes with the larger gear-wheel, T, on the corresponding end of the axle E. Upon the inner or left hand end of the shaft R are secured the gear-wheels V W and cleaner-disks X, the latter being preferably octagonal in outline and suitably separated from each other and from the face of the gear-wheels V W, but having a simultaneous movement with the same through the medium of the collars Y and connecting-pins Z.

It is thought that the disks X will operate a little more effectually as cleaners when having an octagonal outline than they would had they a smooth circular edge. The gear-wheels V W are secured on the shaft R by small screws or pins passing through their hubs and bearing against or entering the said shaft, or in any other ordinary manner, and mesh with and impart motion to the smaller gear-wheels, d e, located upon the outer face of and formed in one piece with the disks f g. The gear-wheels d e and disks f g encircle the center of and have an independent movement on the axle E, and the former have upon their outer faces the annular recesses h, which fit over and form a loose bearing on the hubs i i, rigidly connected with the rollers B B. Small screws pass downward through the hubs i i and firmly impinge the axle E, as shown in Fig. 3, for the purpose of insuring the simultaneous movement of the said axle and rollers B B. The disks f g are concave on their inner faces, and their peripheral edges project toward each other and are beveled inward, as shown more clearly in Fig. 3, for the purpose of forming edges which will coact with the cutters m, hereinafter described, in severing the leaf by what is known as a "draw cut."

Centrally between the disks f g is rigidly fastened, on the axle E, a plain disk, n, on either side of which is a cleaner-plate, t, passing over the axle E, and terminating at a point adjacent to the periphery of the disk, and slightly above the center of the axle E. The shank ends of the cleaner-plates t are attached by screws to the inclined standard w, which is a flat metallic plate of suitable length and width, and whose upper end is cut to form lips x, the central one of which projects in close proximity to the periphery of the disk n, while those on either side of the central lip terminate adjacent to the rear edges of the cleaner-plates t. The cleaner-plates t are located between the disk n and disks f g, above the axle E, and the cleaner disks X rotate between the disk n and disks f g, below said axle, and the purpose of the plates t and disks X is to constantly free the disks f g of gummy matter, clippings, &c., from the tobacco-leaves being treated.

Over the disk n is journaled in the front end of a bar, A', the pair of rotating cutters m, the edges of which pass downward on each side of the disk n, and move against the outer portion of the beveled peripheral edges of the disks f g, hereinbefore described. The rear end of the bar A' is seated in the bearing B', being held therein between the sides C' C' thereof by set-screws D', which pass through said sides and impinge the sides of the bar, and by the pin Q'' passing through the said sides C' and bar. The bar A' may be removed upon the withdrawal of the pin Q'' and the loosening of the screws D'.

As a means of preventing any of the tobacco from being caught, by accident or otherwise, in the gear-wheels V d or W e, I pass a narrow strip of sheet metal, P'', from the bar P upward over said wheels V d, and over wheels W e, and secure its upper end to the plate w, as shown in Fig. 2, which illustrates the edge of the strip passing over wheels V d. The strip of metal which passes over the wheels W e is a duplicate of that shown in Fig. 2, and is omitted from the drawings for the sake of clearness in the latter, and because the strips are merely employed as a precautionary measure.

In the operation of the invention the axles D E and rollers A B receive motion from the main driving-shaft J, as aforesaid, and the axle E imparts motion through the gear-wheels T S to the shaft R, which communicates the same to the gear-wheels V W and cleaner-disks X, and through the wheels V W to the gear-wheels d e and disks f g, the latter of which being in contact at their edges with the knives m rotate them. The motion of the parts of the machine above described causes the aprons G H to unwind from the rollers A and be wound upon the rollers C. The machine being set in motion, the tobacco-leaves to be treated are placed upon the inner portion of the aprons G H, the stem of the leaf being longitudinally over the spaces between the aprons, and fed upward to the rollers C in the customary way, the stem being severed in transit by the cutters m coacting with the disks f g, and carried rearward on the disks n, as shown by dotted lines in Fig. 2.

It is important to note that the disks f g rotate with greater velocity than the axle E and rollers B, and this is due to the fact that the gear-wheels T V W are larger than the gear-wheels S d e. In the present instance the wheels T V W have forty teeth each, and the wheels S d e twenty each, and hence the disks f g will make two and one-quarter revolutions while the rollers B and disk n are making one revolution, the purpose of this operation being to insure the effectual severance of the stem from the leaf.

It will be understood that the velocity with which the disks f g shall rotate may be governed at will by increasing or diminishing the relative proportions of the gear-wheels; but in every instance it will be found advantageous to employ gear-wheels of such relative proportions that the cutting-disks will rotate with greater speed than the aprons G H, feeding the leaf to them, move.

By the adjustment of the nuts K K on the axle E the disks f g may be caused to approach or recede from the edges of the cutters m. (See Figs. 1 and 3.)

While the aprons G H are being wound upon the rollers A, the gear-wheel a'' on the axle D will be permitted to remain in contact with the gear-wheel b'' on the driving-shaft J, and the gear-wheel c'' on the axle E will be disengaged from the wheel b'', and thereafter during the regular operation of the machine the gear-wheel c'' will be brought into contact with the wheel b'', and the wheel a'' removed therefrom, at which time the rollers C, being in frictional contact with the rollers B, will revolve, drawing the aprons G H from the rollers A and winding the same upon themselves.

What I claim as my invention and desire to secure by Letters Patent, is—

1. In a machine for stripping and booking tobacco, two pairs of rotary cutting-disks whose edges overlap each other and receive the stem of the leaf between them and cleaner-disks between one pair of said cutting-disks, combined with the aprons G H, mounted on rollers, mechanism for operating said rollers to cause them to feed and book the leaf, one of the aprons being on each side of the rotary cutting-disks, and gear mechanism, substantially as described, for giving the cutting-disks a more rapid rate of movement than that imparted to the said aprons, substantially as and for the purposes set forth.

2. In a machine for stripping and booking tobacco, the pair of feeding and booking aprons mounted on rollers A C and the rollers B, against which said aprons move, combined with the rotary cutting-disks f g, mounted on the axle E, between the rollers B, the rotary cutting-disks m, the edges of which are in contact with the edges of the disks f g, the disk n, located between and having about the same circumference as the disks f g, and mechanism for moving the said aprons and rotating the disks f g, substantially as set forth.

3. In a machine for stripping and booking tobacco, the pair of feeding and booking aprons mounted on rollers A C and the rollers B, against which said aprons move, combined with the rotary cutting-disks f g, mounted on the axle E, between the rollers B, the rotary cutting-disks m, the edges of which are in contact with the edges of the disks f g, the disk n, located centrally between the said disks f g, a cleaner on each side of the disk n, and mechanism for moving said aprons and rotating the disks f g, substantially as set forth.

4. In a machine for stripping and booking tobacco, a pair of booking-aprons traveling on rollers and a pair of auxiliary rollers against which said aprons move, combined with the rotary cutting-disks f g, loosely mounted on the axle of the auxiliary rollers, the rotary cutting-disks m, coacting with the disks f g, the shaft R, geared to said axle, and gear-wheels V W on said shaft, engaging gearing connected with the disks f g, the relative proportions of the gearing being such as to impart to the cutting-disks a more rapid movement than that of the booking-aprons, substantially as set forth.

Signed at New York, in the county of New York and State of New York, this 11th day of November, A. D. 1885.

GEORGE ROWDEN.

Witnesses:
CHAS. C. GILL,
EDWARD WOLFF.